United States Patent Office 3,430,667
Patented Mar. 4, 1969

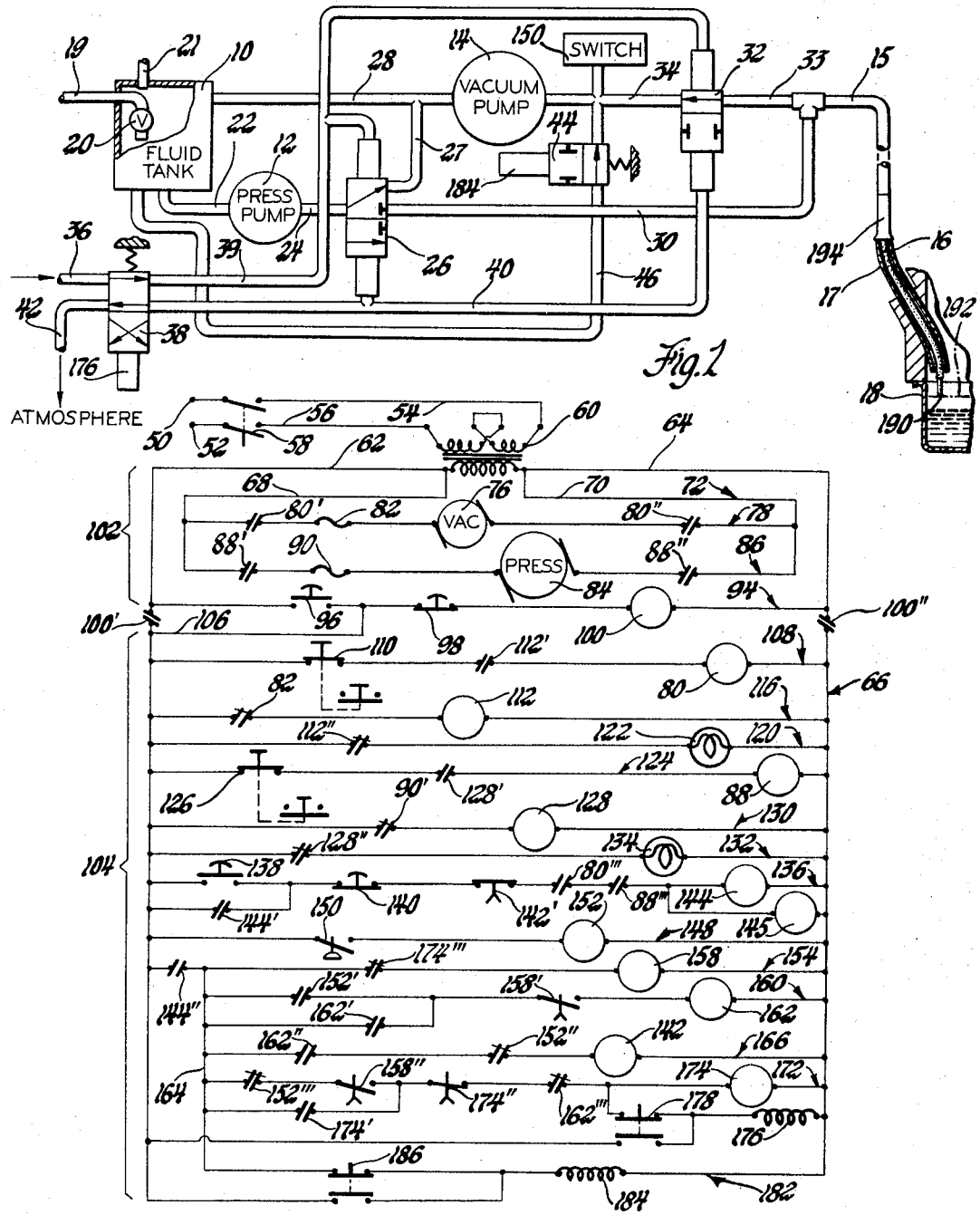

3,430,667
LIQUID LEVELING METHOD AND APPARATUS
Walton Hughes, Scotch Plains, N.J., assignor to General Motors Corporation, Detroit, Mich., a corporation of Delaware
Filed Feb. 23, 1967, Ser. No. 617,878
U.S. Cl. 141—1                                    14 Claims
Int. Cl. G01f 23/22; F16k 21/18

ABSTRACT OF THE DISCLOSURE

This invention relates to a method and apparatus for establishing a predetermined liquid level in a receptacle such as an automatic transmission sump as demonstrated in the preferred embodiment and more particularly to such a method and apparatus employing a leveling cycle having a level checking phase, a withdrawal phase in the event the existing liquid level is high and an overfilling phase in the event the existing liquid level is low followed by a withdrawal phase to remove excess liquid.

---

There are several difficulties in rapidly establishing the liquid level in a receptacle particularly where the receptacle's fill passage is small and the receptacle has previously received varying amounts of liquid resulting in the existing liquid level being either high or low. For example, in conventional liquid leveling apparatuses which overfill the receptacle through one hose and withdraw the excess fluid through another hose, the fill neck or passage in many applications is too small to accommodate both hoses simultaneously. Where the fill and withdrawal operations are manually controlled and the operator determines whether or not to add or remove liquid, the operator time and effort is considerable and uniformity in liquid level is difficult to maintain on a production basis.

The present invention is particularly well suited for establishing the oil level in a motor vehicle's automatic transmission and is especially useful on a vehicle final assembly line as will be demonstrated. Apparatus for carrying out the process of the present invention comprises a probe insertable into the transmission fill pipe. The probe is connected to a hose which is selectively connected to a pressure pump and a vacuum pump by separate valves automatically controlled in a predetermined sequence by an electrical circuit responsive to pressure signals generated at the probe end. The probe which is used to both add fluid and withdraw the excess fluid and also generate and transmit the signals to control the fill and withdrawal operations is first inserted into the transmisison fill pipe so that the probe end is at the desired oil level. The vacuum pump is initially connected to the probe and the pressure pump is disconnected in a level checking phase. If the probe end is in air in the transmission sump because of an existing low oil level, the vacuum pump is connected to the probe and pulls air through transmission fill pipe and thence through the probe with the result that the vacuum pump inlet pressure is near atmospheric pressure since the air can flow freely through the probe and connected hose at a greater rate than the vacuum pump capacity. If the end of the probe is in oil because of an existing high oil level, the air is evacuated in the probe and hose and oil flows therethrough with the fluid friction causing the pump inlet pressure to drop to a vacuum. The electrical circuit has a vacuum switch controlled by vacuum pump inlet pressure to determine the connections of the vacuum pump and pressure pump to the probe. If the oil level is initially low with the end of the probe in air, the presseure pump is connected to the probe and the vacuum pump is disconnected at the termination of the level checking phase. The pressure pump then delivers a predetermined amount of oil to the transmission sump in a filling phase after which the leveling apparatus reverts back to the level checking phase to check for high or low oil level in the transmission sump. If the oil level is still low the fill phase will occur again with the fill and check operation continuing until an overfull condition is established. If the oil level is initially high or at the termination of the last filling operation, the vacuum pump is connected to the probe and the pressure pump is disconnected. The vacuum pump then withdraws the excess oil from the transmission sump to establish the desired oil level in a withdrawal phase to complete the leveling cycle. Thus, the cycle always terminates with the withdrawal phase which is never required to withdraw more than the predetermined amount when the initial level is low.

An object of the present invention is to provide a new and improved liquid leveling method and apparatus.

Another object is to provide a liquid leveling method and apparatus employing a leveling cycle having a level checking phase, a withdrawal phase in the event the liquid level is high to remove excess fluid and an overfilling phase in the event the liquid level is low followed by a withdrawal phase to remove excess liquid.

Another object is to provide a liquid leveling method and apparatus for automatically establishing the liquid level in a receptacle by delivering liquid in predetermined amounts with a fill and check operation until an overfull condition is achieved whereafter the desired level is established by withdrawing the excess liquid.

Another object is to provide a liquid leveling method and apparatus employing a single probe for adding liquid, withdrawing excess liquid and also generating a signal to automatically control the filling and withdrawal operations.

Another object is to provide a liquid leveling method and apparatus for automatically establishing the oil level in a motor vehicle's transmission by pressure checking the existing oil level in the transmission sump with a single probe whose end is positioned at the desired oil level, withdrawing oil through the probe in the event the existing oil level is high, and adding oil in predetermined amounts through the probe in the event the existing oil level is low until the desired oil level is exceeded followed by withdrawing the excess oil through the probe until the oil level is reached.

These and other objects of the present invention will be more apparent from the following description and drawing in which:

FIGURE 1 schematically illustrates the hydraulic and pneumatic components of the leveling apparatus for carrying out the leveling process of the present invention.

FIGURE 2 schematically illustrates the electrical circuit for automatically controlling the hydraulic and pneumatic components shown in FIGURE 1.

The present invention is demonstrated as filling a motor vehicle's automatic transmission on a final assembly line. In this application of the invention it is used to automatically perform a top-off operation to either add or remove oil as required to establish the correct oil level while the vehicle's engine is running. The engine will have initially been filled so that the engine can be run for a short time to force air out of the automatic transmission's hydraulic system before the top-off operation, the initial transmission oil level being not less than a minimum operating level below the correct operating oil level so that air will not be pumped through the transmission and cause foaming. The apparatus comprises a tank 10, an electric-motor-driven pressure pump 12, an electric-motor-driven vacuum pump 14 and associated valves for connecting the pumps to a flexible hose 15 connected to a flexible hollow probe 16. The tank, pumps and associated valves are all mounted on a carriage (not shown) that runs on an overhead rail above the vehicle assembly line. The carriage supporting these components is preferably propelled by an air tractor. The air tractor is suitably controlled so that the carriage follows close to the vehicle whose transmission is being filled with only a few pounds pull on the flexible hose 15 when the probe 16 is positioned in the vehicle's transmission fill pipe 17 which is open to the transmission sump 18.

The tank 10 is fed with transmission oil via a supply line 19 through a float valve 20 so that a constant oil level is maintained in the tank which is vented to the atmosphere by a vent 21. The pressure pump 12 is a positive displacement gear type pump and receives the transmission oil from the tank through a suction line 22 and discharges the oil under pressure to a main line 24. Main line 24 is connected to a pneumatically operated slave valve 26. Valve 26 is operable in a bypass position as shown to connect the main line 24 via a bypass line 27 to a line 28 connecting the discharge side of the vacuum pump 14 to tank 10 and is operable in a fill position to disconnect lines 24 and 27. Valve 26 is also operable in the fill position to connect the main line 24 to a line 30 connected to hose 15 and is also operable in the bypass position to disconnect lines 24 and 30. A pneumatically operated slave valve 32 is operable in an evacuating position as shown to connect the hose 15 via a line 33 to a vacuum or suction line 34 connected to the suction side of the vacuum pump 14 and is operable in a nonevacuating position to disconnect lines 33 and 34.

Air pressure to operate the above-described pneumatically operated slave valves is provided by any suitable air pressure source and delivered to a flexible main air pressure hose 36. A solenoid pilot valve 38 controls operation of both slave valves 26 and 32. When pilot valve 38 is de-energized as shown it is spring biased to connect both the main air hose 36 to a flexible hose 39 communicating with one pressure side of both valves 26 and 32 and a flexible hose 40 communicating with the opposite pressure sides of valves 26 and 32 to an exhaust line 42 exhausting to atmosphere. With these connections, valve 26 is conditioned by the air pressure in its bypass position and valve 32 is positioned in its evacuating position. When pilot valve 38 is energized, it connects main air line 36 to hose 40 to deliver air pressure to the opposite pressure sides of valves 26 and 32 and connects hose 39 to the exhaust line 42 to exhaust the other pressure sides of the slave valves. Thus, with solenoid valve 38 energized, valve 26 is moved by the air pressure to its fill position and valve 32 is moved by the air pressure to its non-evacuating position.

The vacuum pump 14 is a positive displacement gear type pump which is lubricated and has its vacuum seal maintained by an oil supply. A solenoid bleed valve 44 is provided which is operable in an open position as shown to connect the tank 10 via a lube feed line 46 to the vacuum pump suction line 34 and is operable in a closed position to disconnect lines 46 and 34.

The apparatus thus far described is automatically controlled according to a predetermined sequence by the electrical circuit shown in FIGURE 2. In the following description of the control circuit the same numeral is used to identify a relay coil and the one or more contacts it controls but with the contact identifying numeral primed.

The electrical circuit has two input terminals 50 and 52 for connection to a suitable power source. The input terminals 50 and 52 are connected by means of lines 54 and 56, respectively, and a two-pole, disconnect switch 58 to the terminals of the primary winding of an input, step-down transformer 60. The respective terminals of the secondary winding of the control transformer 60 are connected to the lines 62 and 64 of an automatic control circuit generally designated as 66 and also the lines 68 and 70 of a motor operating circuit generally designated as 72.

In the motor operating circuit 72, the vacuum pump motor 76 is connected in a vacuum pump motor circuit 78 across lines 68 and 70 by means of normally-open relay contacts 80' and 80" and a thermal overload element 82 in the manner shown. The pressure pump motor 84 is connected in a pressure pump motor circuit 86 across lines 68 and 70 by means of normally-open relay contacts 88' and 88" and a thermal overload element 90 in the manner shown.

A master start and stop circuit generally designated as 94 comprises a normally-open, push-button start switch 96, a normally-closed, push-button, stop switch 98 and a relay coil 100 which are connected in a series across lines 62 and 64 in the upper circuit portion 102 of the automatic control circuit 66. The upper circuit portion 102 is connected to the lower circuit portion 104 by means of normally-open relay contacts 100' and 100" in lines 62 and 64 respectively, the relay contacts 100' and 100" being controlled by relay coil 100 in the master start and stop circuit 94. The master-stop switch 98 and relay coil 100 are connected across the master-start switch 96 by a line 106 to line 62 in the lower circuit portion 104.

In the lower circuit portion 104 there is provided a motor-start circuit 108 for controlling the starting of the vacuum pump motor 76. The circuit 108 comprises a push-botton switch 110 which maintains contact, a normally-open relay contact 112' and a relay coil 80 which controls the vacuum pump motor's relay contacts 80' and 80" in circuit 78. The switch 110, contact 112' and coil 80 are connected in series across lines 62 and 64 in the lower circuit portion 104.

The circuit generally designated as 116 is for generating a signal indicating whether or not the vacuum pump 14 is overloaded and comprises a normally-closed relay contact 82' controlled by the vacuum pump motor's overload element 82 and a relay coil 112 which controls relay contact 112' in the vacuum pump's motor start circuit 108. Contact 82' and relay coil 112 are connected in series across lines 62 and 64 in the lower circuit portion 104.

The circuit generally designated at 120 is for visually indicating whether or not the vacuum pump motor is overloaded and comprises an indicating light 122 and a normally-closed relay contact 112" controlled by relay coil 112 in the vacuum pump motor overload signal circuit 116. Contact 112" and light 122 are connected in series across lines 62 and 64 in the lower circuit portion.

The circuit 124 is for starting the pressure pump motor motor and comprises a push-button switch 126 which maintains contact, a normally-open relay contact 128' and a relay coil 88 which controls the pressure pump motor's relay contacts 88' and 88" in circuit 86. The switch 126, contact 128' and relay coil 88 are connected in series across lines 62 and 64 in the lower circuit portion.

The circuit 130 is for generating a signal indicating whether or not the pressure pump 12 is overloaded and comprises a normally-closed relay contact 90' controlled by the pressure pump motor's overload element 90 and a relay coil 128 which controls relay contact 128' in the pressure pump motor start circuit 124. Contact 90' and relay coil 128 are connected in series across lines 62 and 64 in the lower circuit portion.

The circuit 132 is for visually indicating whether or not the pressure pump is overloaded and comprises an indicating light 134 and a normally-closed relay contact 128" controlled by relay coil 128 in the pressure pump motor overload signal circuit 130. Contact 128" and light 134 are connected in series across lines 62 and 64 in the lower circuit portion.

The circuit 136 is for automatically starting, holding and delaying the leveling cycle and comprises a normally-open, push-button, operator-start switch 138, a normally-closed, push-button, operator-stop switch 140 and a normally-closed, time-delay relay contact 142' which delays opening after its controlling coil is energized. Circuit 136 further comprises a normally-open relay contact 80''' controlled by relay coil 80 in the vacuum pump motor start circuit 108, a normally-open relay contact 88''' controlled by relay coil 88 in the pressure pump motor start circuit 124, a relay coil 144, an indicating light 145 and a normally-open relay contact 144' controlled by relay coil 144. Switches 138 and 140, contacts 142', 80''' and 88''' and relay coil 144 are connected in series across lines 62 and 64 in the lower circuit portion. The relay contact 144' is connected across the operator start switch 138 and the light 145 is connected across coil 144.

Circuit 148 is controlled by the pressure signals generated at the probe and comprises a vacuum switch 150 connected as shown in FIGURE 1 to the vacuum pump suction line 34 and a relay coil 152. The switch 150 and relay coil 152 are connected in series across lines 62 and 64 in the lower circuit portion.

The circuit 154 controls a delay checking operation for vacuum checking and comprises a normally-open relay contact 144'' controlled by relay coil 144 in the start, hold and delay circuit 136, a normally-closed relay contact 174''' and a relay coil 158. The contacts 144'' and 174''' and the coil 158 are connected in series across lines 62 and 64 in the lower circuit portion.

The circuit 160 controls the evacuating operation and comprises a normally-open relay contact 152' controlled by relay coil 152 in the pressure controlled circuit 148 and a normally-open relay contact 162'. Circuit 160 further comprises a normally-open time-delay relay contact 158' which is controlled by relay coil 158 in the vacuum check delay control circuit 154 and delays closing after coil 158 is energized, and a relay coil 162 which controls relay contact 162'. The contacts 152' and 158' and the relay coil 162 are connected in series across line 64 and a line 164 which is connected by means of relay contact 144'' to line 62 in the lower circuit portion. The relay contact 162' is connected across relay contact 152'.

The circuit 166 is for controlling the stopping of the leveling cycle and comprises a normally-open relay contact 162'' controlled by relay coil 162 in the evacuation control circuit 160, a normally-closed relay contact 152'' controlled by relay coil 152 in the pressure controlled circuit 148 and a relay coil 142 which controls the time-delay relay contact 142' in the start, hold and delay circuit 136. The contacts 162'' and 152'' and the relay coil 142 are connected in series across lines 164 and 64.

The circuit 172 is for controlling and timing the filling operation and comprises a normally-closed relay contact 152''' controlled by relay coil 152 in the pressure responsive circuit 148, a normally-open relay contact 174' and a normally-open, time-delay relay contact 158'' controlled by relay coil 158 in the vacuum check delay circuit 154 which contact delays closing after coil 158 is energized. Circuit 172 further comprises a normally-closed, time-delay relay contact 174'' which delays opening after its controlling coil is energized, a normally-closed relay contact 162''' controlled by relay coil 162 in the evacuation control circuit 160, and a relay coil 174 which controls both contacts 174' and 174'' in this circuit and contact 174''' in circuit 154. Contacts 152''', 158'', 174'' and 162''' and relay coil 174 are connected in series across lines 164 and 64 in the lower circuit portion. The relay contact 174' is connected across contacts 152''' and 158''. The solenoid 176 of pilot valve 38 is normally connected in circuit 172 across relay coil 174 by means of a double-pole, jog-fill switch 178. Jog-fill switch 178 is operable at its other pole to connect solenoid 176 directly across lines 62 and 64 in the lower circuit portion.

The circuit 182 is for controlling the bleeding of oil to vacuum pump 14 and comprises the solenoid 184 of pilot valve 44 which solenoid is normally connected by means of a double-pole, jog switch 186 across lines 164 and 64. Switch 186 is operable at its other pole to connect solenoid 184 directly across lines 62 and 64 in the lower circuit portion.

To illustrate the liquid leveling process provided by the combined operation of all the apparatus described above and the results obtained, recourse is made to an actual apparatus constructed according to the present invention in which the following ratings and settings were used to provide an automatic top-off operation to either add or remove oil as required to establish the correct oil level in the automatic transmission of a vehicle while the engine is running.

*Pump ratings*

Pump:                                               Capacity
    Pressure pump 12 _____qts./3 seconds__ 1
    Vacuum pump 14 _____g.p.m__ 1

*Pressure switch setting*

Switch _____ Vacuum switch 150
Open _____ 14'' Hg vac.
Close (hold) _____ 17'' Hg vac.

*Time-delay settings*

Time-delay relay contact:        Time delay, seconds
    142' _____ 4.0
    158' _____ 1.8
    158'' _____ 1.8
    174'' _____ 3.0

Prior to the apparatus performing the automatic top-off operation, the automatic transmission will have had an initial fill prior to engine start-up so that the engine can be run to bleed air out of the transmission control system. In the transmission systems that were actually filled or topped-off, the oil level must be no more than two (2) quarts low during engine running so that air will not be pumped through the transmission system and cause foaming. It was found that accurate leveling as subsequently described was best obtained with the engine running at a constant speed slightly higher than idle speed during the top-off operation. Thus, the vehicle approaches the liquid leveling apparatus of the present invention with the engine running and the transmission sump initially filled no more than two (2) quarts below the desired oil level and possibly overfilled. In most instances the initial oil level is low.

Describing now the liquid leveling process provided by the hydraulic and pneumatic components in the automatic operating sequence provided by the electric control circuit, the disconnect switch 58 is normally closed and the apparatus is readied for top-off operations by pressing the master-start switch 96 as for example, at the beginning of an operator shift. Upon closing of switch 96, the relay coil 100 is energized, and remains energized after release of switch 96 by closing relay contact 100'. The energized relay coil 100 also closes relay contact 100'' so that the electrical power feeds through both lines 62 and 64 from the upper circuit portion 102 to the lower circuit portion 104. The relay coil 112 in circuit 116 and relay coil 128 in circuit 130 are energized upon power delivery to the lower circuit portion and close relay contact 112' in the vacuum pump motor circuit 108 and relay contact 128' in the pressure pump motor start circuit 124, respectively.

The vacuum pump motor start switch 110 in circuit 108 and the pressure pump motor start switch 126 in circuit 124 are normally closed as shown and thus the vacuum pump motor relay coil 80 and the pressure pump motor relay coil 88 are energized The energized relay coils 80 and 88, respectively, close the relay contacts 80' and 80'' in the vacuum pump motor circuit 78 and the relay contacts 88' and 88'' in the pressure pump motor circuit 86 to start the vacuum pump motor 76 and pressure pump motor 84. The energized motor relay coil 80 and 88, respectively, open the relay contact 112" in circuit 120 and the relay contact 128" in circuit 132 to de-energize or turn off the vacuum pump overload indicating light 122 and pressure pump overload indicating 134. The jog switches 178 and 186 are normally closed as shown and the solenoids 176 and 184 are de-energized.

With solenoid 176 de-energized, pilot valve 38 is positioned in its normal spring biased position as shown. Thus, valve 26 is positioned in its bypass position as shown connecting main oil line 24 to bypass line 27 and disconnecting lines 24 and 30 so that all the oil discharged by pressure pump 12 is returned to tank 10. Valve 32 is positioned in its evacuating position connecting hose 15 to suction line 34 and connected vacuum pump 14 so that the vacuum pump draws air through the probe 16 whose end 190 is open to atmosphere prior to probe insertion in a transmission fill pipe.

With solenoid 184 de-energized, valve 44 is spring biased to its open position as shown connecting the tank 10 via line 46 to the vacuum pump suction line 34 whereby oil flows at a slow flow rate from the tank to the vacuum pump to provide vacuum pump lubrication and aid in establishing the pump's vacuum seal.

With the air rushing through the suction line 34 with the probe end in air, the vacuum switch 150 is subjected to substantially atmospheric pressure since the air can flow freely through the passage to the vacuum pump suction side at a greater rate than the 1 g.p.m. capacity of the vacuum pump 14. Thus, the vacuum switch 150 is open. The vacuum pump is connected to the probe so that the correct signal will be transmitted to vacuum switch 150 when the probe is inserted in a transmission fill pipe.

The apparatus is now in readiness to perform an oil level or top-off operation on the transmission of a vehicle approaching the final assembly conveyor.

When the vehicle has reached the operator, he inserts the flexible probe 16 in the transmission fill pipe 17 so that the probe end 190 is at the desired oil level designated as 192. Preferably, the handle 194 of the probe abuts the fill pipe lip to establish the correct probe penetration into the sump. The flexibility of the hollow probe permits its insertion into a curved fill pipe. After the probe is inserted, the operator presses the start switch 138 in the master circuit 136 to energize relay coil 144 and turn on the light 145 to indicate a leveling cycle is in progress, contacts 80''' and 88''' having previously been closed by the energized motor relay coils 80 and 88, respectively, when the master start switch 96 was closed. Coil 144 remains energized after release of switch 138 by closing relay contact 144'. The energized relay coil 144 also closes relay contact 144" to deliver power to solenoid 184 to close valve 44 to stop the delivery of oil from the tank to the vacuum pump. Relay coil 158 in the vacuum check delay control circuit 154 is also energized upon the closing of relay contact 144" and starts the timing of both time-delay relay contact 158' in the evacuation control circuit 160 for oil level checking and the time-delay relay contact 158" in the filling control circuit. The operating sequence of the apparatus thereafter depends on whether the existing oil level is low or high.

*Low level operation*

When the initial oil level in the transmission sump is below the end of probe 190 which occurs in most instances, air is pulled through the fill pipe 17 past the outside of the probe and then flows freely into the probe end whereby no appreciable vacuum is generated. The pressure in suction line 34 is slightly below atmospheric pressure since the air can flow freely through the hose 15 at a greater rate than the vacuum pump capacity and thus the vacuum switch 150 remains open and the relay coil 152 in circuit 148 remains de-energized. Both relay contacts 158' and 158" time out and close after 1.8 seconds which is sufficient time to generate the correct vacuum signal when the transmission oil level is high. The closing of contact 158" in circuit 172 energizes solenoid 176 and relay coil 174 which coil closes relay contact 174' so that coil 174 and solenoid 176 will remain energized upon subsequent opening of relay contact 152'''. With solenoid 176 energized the pilot valve 38 is shifted to supply air pressure to condition valve 26 in its fill position closing the bypass and connecting the main oil line 24 to line 30 and connected hose 15 and probe 16. Valve 38 also delivers air pressure to condition valve 32 in its nonevacuating position disconnecting hose 15 and vacuum pump suction line 34. Pressure pump 12 is thus connected to deliver oil via hose 15 and connected probe 16 to the transmission sump. The energized relay coil 174 opens the relay contact 156' in the vacuum check delay control circuit 154 so that relay coil 158 is de-energized. Thus, the time-delay relay contact 158' in the evacuation control circuit 160 and the time-delay relay contact 158" in the fill control circuit 172 are opened for a subsequent check and fill operation as described later.

Energization of relay coil 174 started the time-delay relay contact 174" timing and after three (3) seconds it times out and opens to de-energize the solenoid 176 to control the pilot valve 38 to shift or return both valve 26 to its bypass position and valve 32 to its evacuating position. The three (3) seconds provides sufficient time for the pressure pump 12 which is driven at a constant speed to deliver just one quart of oil to the transmission sump.

At the end of the three (3) second filling operation the relay coil 174 is de-energized by the opening of the time-delay relay contact 174" and closes the relay contact 174''' to energize relay coil 158. The energized relay coil 158 starts the timing action of the relay contacts 158' and 158" for another checking operation which will be followed by another fill operation to add one (1) quart of oil if required.

The apparatus evacuates for 1.8 seconds and again makes a check for oil or air returning through probe 16. The apparatus oscillates between the check and fill operations until oil is pulled back during the check operation indicating an overfull or excess oil condition, i.e. high oil level. Thus, the amount of excess oil does not exceed the predetermined amount delivered during a filling operation when the initial level is low thereby minimizing the time required for excess oil withdrawal which will now be described.

When oil is pulled back through the probe 16 during the checking operation the fluid friction in the evacuating passage will cause a drop in pressure at the vacuum switch 150. The evacuating passage between the probe end 190 and the suction side of vacuum pump 14 provided by hollow probe 16, hose 15, valve 32 and suction line 34 is sized so that an oil flow of 1 g.p.m. will develop a maximum pressure drop of 25" Hg. Thus, the pump suction pressure will not exceed 25" Hg vacuum which limit is established since higher suction pressure would cause cavitation in the vacuum pump that was used.

Upon closing of the pressure switch 150 which occurs within 1.8 seconds and at 17" Hg the relay coil 152 is energized. The energized relay coil 152 opens relay contact 152''' in the fill control circuit 172 to lock out or prevent the fill operation previously described. The energized relay coil 152 also closes the relay contact 152' in circuit 160 and at the end of the check period with the relay contact 158' having timed in and closed after 1.8 seconds, the relay coil 162 is energized and remains energized after the checking operation by closing contact 162'. The energized relay coil 162 opens relay contact 162''' in the fill control circuit 172 to prevent energization of the solenoid 176 of pilot valve 38 so that fill action is blocked after the vacuum switch 150 opens and the relay coil 152 is de-energized during the excess oil withdrawal.

The evacuation of the excess oil from the transmission sump continues until air enters the probe end 190 and causes the vacuum in suction line 34 to decrease to 14″ Hg, the entry of air in the probe indicating the correct oil level has been reached. At 14″ Hg the vacuum switch 150 opens to de-energize relay coil 152. With relay contact 162″ in the stop control circuit 166 closed by the energized coil 162, and relay contact 152″ in the same circuit closed by the de-energized relay coil 152, the relay coil 142 is energized to start the time-delay relay contact 142′ in the master circuit 136 timing. The relay contact 142′ opens after four (4) seconds to de-energize relay coil 144 which opens contact 144′. The de-energized relay coil 144 also opens the relay contact 144″ to de-energize relay coil 162 in circuit 160 and coil 142 in circuit 166 and the cycle is terminated with solenoid 176 of pilot valve 38 de-energized and thus valve 26 in its bypass position and valve 32 in its evacuating position. The four (4) second delay or drop out action required for cycle termination prevents a bubble or ripple in the sump oil level from causing early or premature shut off before the correct level is reached. The solenoid 184 is de-energized upon opening of contact 144″ so that valve 44 is opened and oil bleeds from the tank to the vacuum pump 14 and thus the apparatus has reverted to its ready condition for another leveling cycle. At cycle termination the cycle light 145 goes off in the master circuit 136 indicating to the operator that he may remove the probe.

*High level operation*

When the transmission sump is initially overfilled, the vacuum in suction line 34 increases because of the friction of the oil flow and at 17″ Hg closes vacuum switch 150 to energize relay coil 152 during the checking operation while the time-delay relay contacts 158′ and 158″ are timing out. With relay coil 152 energized, the relay contact 152‴ opens to lock out the fill operation previously described. The energized relay coil 152 closes the relay contact 152′ and at the end of the check period with the time-delay relay contact 158′ timed out and thus closed relay coil 162 is energized and remains energized after the checking operation by closing contact 162′. The energized relay coil 162 opens relay contact 162‴ in the fill control circuit 172 to prevent energization of the solenoid 176 of pilot valve 38 so that filling action is blocked after the vacuum switch 150 opens and the relay coil 152 is de-energized during continued withdrawal of the excess oil.

Evacuation of the excess oil continues until air enters the probe end 190 and causes the vacuum in the suction line 34 to decrease to 14″ Hg. Vacuum switch 150 opens at 14″ Hg to de-energize relay coil 152. Since relay contact 162″ in circuit 166 was closed upon energization of relay coil 162 and relay contact 152″ was closed upon de-energization of relay coil 152, the relay coil 142 is energized and starts the timing of relay contact 142′ in the master circuit 136. The relay contact 142′ opens after its four (4) second delay to de-energize relay coil 144 and thus open contact 144′. Upon de-energization of relay coil 144 the relay contact 144″ is opened to de-energize relay coil 162 in circuit 160 and relay coil 142 in circuit 166 and the cycle is terminated with solenoid 176 of pilot valve 38 de-energized and thus valve 26 in its bypass position and valve 32 in its evacuating position. Solenoid 184 is de-energized by the opening of contact 144″ and thus valve 44 is open so that the oil bleed for lubricating and sealing the vacuum pump is established. Cycle termination with the apparatus thus reverted to its ready condition is indicated by the light 145 going off and the operator may then remove the probe.

In the transmissions that were actually filled the oil level had a normal variation of plus or minus one-eighth inch ($\pm \frac{1}{8}$″) from the correct level which is typical of the accurate liquid leveling operations provided by the present invention. Furthermore, greater accuracy can be obtained in applying the subject apparatus to level the fluid in an open container where there is no possibility of pressure changes such as can occur in a closed transmission sump.

The operator can stop the vacuum pump motor 76 by opening the switch 110 in circuit 108 and also can stop the pressure pump motor 84 by opening the switch 126 in circuit 124 before and during the automatic cycle to service the apparatus. The operator can also override the automatic leveling cycle by operating the jog switch 178 in circuit 172 to connect the solenoid 176 of pilot valve 38 directly across lines 62 and 64 so that valve 26 is held in its fill position to connect the pressure pump to the fill probe 16 for an operator controlled fill operation. The operator can operate the jog switch 186 in circuit 182 to connect the solenoid 184 of valve 44 directly across lines 62 and 64 so that valve 44 is closed to block the oil bleed to the vacuum pump during the operator controlled filling operation.

The above-described preferred embodiment is illustrative of the process and apparatus according to the present invention which may be modified within the scope of the appended claims.

I claim:

1. A process for establishing a desired liquid level in receptacles which may have liquid therein and thus have an initial liquid level which may be either low or high comprising the steps of
    (a) generating a signal indicating the liquid level in the receptacle to be low or high,
    (b) alternately delivering a predetermined amount of liquid to the receptacle in response to a low liquid level signal and repeating step (a) until a high liquid level signal is generated,
    (c) withdrawing the excess liquid from the receptacle in response to a high liquid level signal to establish the desired liquid level whereby liquid withdrawal occurs whether or not the initial liquid level is high or low.

2. The process set forth in claim 1 and both transmitting the liquid level signals and delivering and withdrawing the liquid through a single hollow probe inserted into the receptacle with the probe end at the desired liquid level.

3. The process set forth in claim 2 and generating the liquid level signals by applying a vacuum to the probe.

4. The process set forth in claim 2 and both generating the liquid level signals and withdrawing the excess liquid by applying a vacuum to the probe.

5. The process set forth in claim 2 and delivering the predetermined amount of liquid at a constant volumetric flow rate in a sufficient time interval.

6. A process for establishing a desired liquid level in a receptacle having an initial low liquid level comprising the steps of
    (a) generating a signal indicating the liquid level in the receptacle,
    (b) alternately delivering a predetermined amount of liquid to the receptacle in response to a low liquid level signal and repeating step (a) until a high liquid level signal is generated,
    (c) withdrawing the excess liquid from the receptacle to establish the desired liquid level.

7. A process for establishing a desired liquid level in a transmission sump having a fill pipe and an initial liquid level which may be either low or high comprising the steps of
    (a) inserting a single hollow probe into the fill pipe so that the probe end is at the desired liquid level,
    (b) automatically applying a vacuum to the probe to generate a vacuum signal indicating whether the probe end is above or below the existing liquid level in the sump,
    (c) automatically and alternately delivering a predetermined amount of liquid through the probe to the sump in response to a low liquid level signal and repeating step (b) until a high liquid level signal is generated, (d) automatically withdrawing the excess liquid from the sump through the probe in response to a high liquid level signal to establish the desired liquid level whereby liquid withdrawal occurs whether or not the initial liquid level is high or low.

8. The process set forth in claim 7 and delivering the predetermined amount of liquid at a constant volumetric flow rate in a sufficient automatically controlled time interval, withdrawing the excess liquid by applying a vacuum to the probe.

9. Apparatus for establishing a desired liquid level in a receptacle having an initial liquid level which may be either low or high comprising the combination of passage means including a hollow probe which is insertable into the receptacle so that the probe end is at the desired liquid level, a source of vacuum, passage means including first valve means for selectively connecting said vacuum source to said probe to generate a signal indicating the liquid level in the receptacle, a source of liquid under pressure, passage means including second valve means for delivering predetermined amounts of liquid from said liquid source through said probe to the receptacle in response to low liquid level signals until a high liquid level signal is generated, said first valve means also being responsive to a high liquid level signal to maintain connection of said vacuum source to said probe to withdraw the excess liquid in the receptacle to establish the desired liquid level.

10. Apparatus for establishing a desired liquid level in a receptacle comprising the combination of a source of liquid under pressure, a vacuum source, first passage means including a hollow probe insertable into the receptacle so that the probe end is at the desired liquid level, second passage means including valve means operable to connect and disconnect said liquid source and said first passage means, third passage means including valve means operable to connect and disconnect said vacuum source and said first passage means, and control means including pressure sensing means connected to said third passage means operable to control both said valve means to normally connect said vacuum source to said first passage means and disconnect said liquid source and said first passage means and also to establish such connections in response to a low vacuum and to connect said liquid source to said first passage means and disconnect said vacuum source and said first passage means for a predetermined time interval in response to a high vacuum.

11. Apparatus for establishing a desired liquid level in a receptacle having an initial liquid level which may be either low or high comprising the combination of a hollow probe insertable into the receptacle so that the probe end is at the desired liquid level, a vented tank containing liquid, a pressure pump having intake and discharge passages, said pressure pump intake passage connected to said tank, a vacuum pump having intake and discharge passages, a bypass passage, a flexible hose connected to said probe, first passage means operatively connecting said pressure pump discharge passage to said hose and said bypass passage, both said vacuum pump discharge passage and said bypass passage connected to said tank, said first passage means including a first valve operable in a bypass condition to block flow from said pressure pump to said hose and permit flow to said tank via said bypass passage and operable in a fill condition to block flow to said tank and permit flow to said hose, second fluid passage means operatively connecting said vacuum pump intake passage to said hose, said second fluid passage means including a second valve operable in an open condition to permit flow from said hose to said vacuum pump intake passage and operable in a closed position to block flow to said vacuum pump intake passage.

12. The apparatus set forth in claim 11 and control means including pressure sensing means connected to sense the vacuum pump intake pressure for controlling the operation of said first and second valve to normally condition said first valve in said bypass condition and said second valve in said open condition so that said pressure sensing means receives a pressure signal from said probe, automatically condition said first valve in said fill condition and said second valve in said closed condition in response to a low level pressure signal, automatically condition said first valve in said bypass condition and said second valve in said open condition after a predetermined time interval.

13. The apparatus set forth in claim 12 and said receptacle being a transmission sump having a fill pipe receiving said probe, said probe being a flexible tube.

14. The apparatus set forth in claim 12 and said pressure pump being a constant speed positive displacement pump.

References Cited

UNITED STATES PATENTS

| 2,925,101 | 2/1960 | Dunham | 141—95 |
| 3,282,020 | 11/1966 | Smith | 141—95 X |

HOUSTON S. BELL, JR., *Primary Examiner.*

U.S. Cl. X.R.

141—95, 115; 73—301; 137—391